Figure 1:
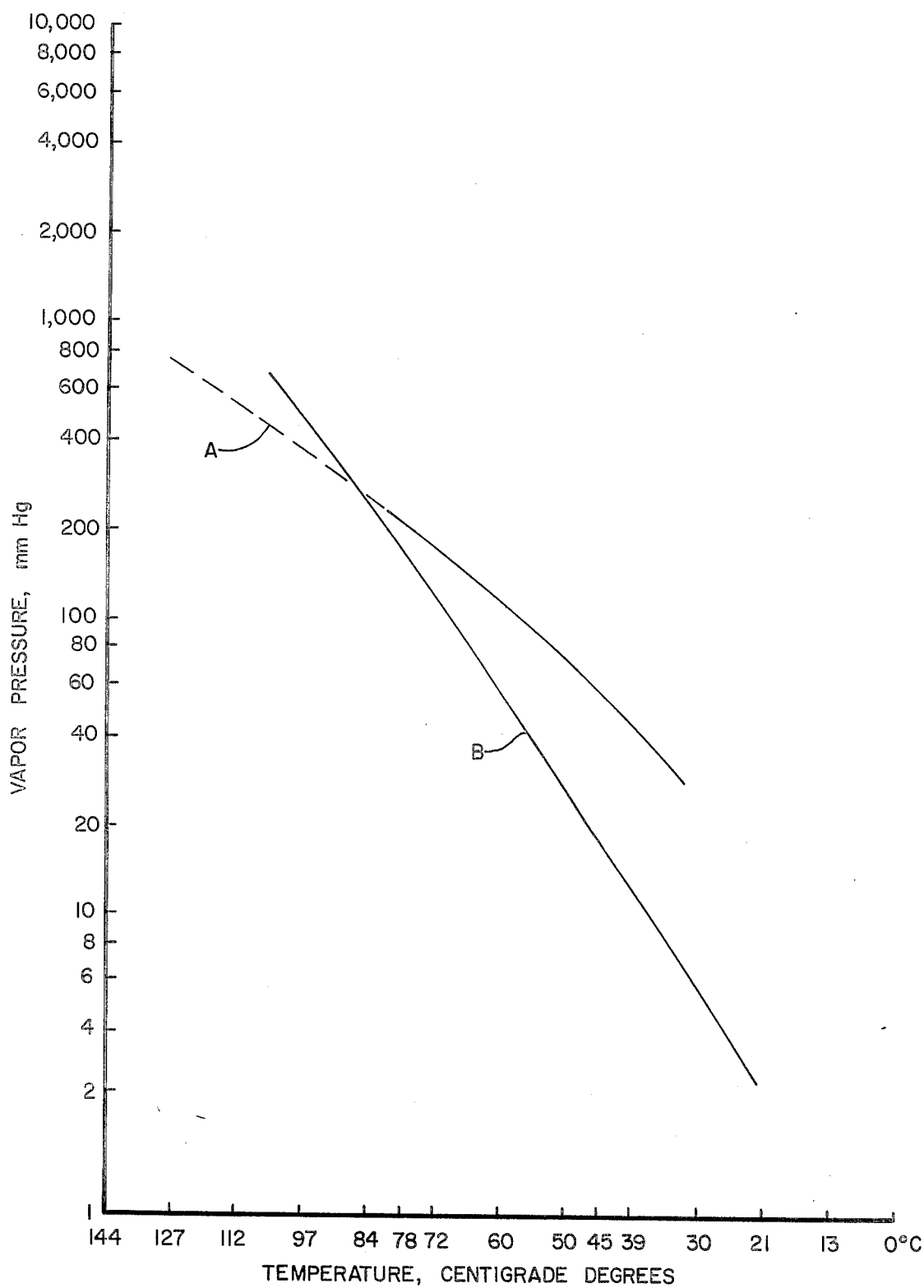

United States Patent [19]

Dunlap et al.

[11] 3,894,081

[45] July 8, 1975

[54] RECOVERY OF PENTAHYDRATE TRISODIUM SALT OF CARBOXYMETHOXY SUCCINIC ACID FROM AQUEOUS SOLUTION

[75] Inventors: William J. Dunlap, Seabrook, Tex.; Carroll W. Lanier, Baker, La.

[73] Assignee: Ethyl Corporation, Richmond, Va.

[22] Filed: Feb. 15, 1974

[21] Appl. No.: 442,808

Related U.S. Application Data

[63] Continuation-in-part of Ser. No. 288,030, Sept. 11, 1972, abandoned.

[52] U.S. Cl. ............................................. 260/535 P
[51] Int. Cl. ............................................. C07c 59/22
[58] Field of Search ................................ 260/535 P

[56] References Cited
UNITED STATES PATENTS
3,692,685  9/1972  Lamberti ........................ 260/535 P Primary Examiner—Anton H. Sutto
Assistant Examiner—Paul J. Killos
Attorney, Agent, or Firm—Donald L. Johnson; John F. Sieberth; Shelton B. McAnelly

[57] ABSTRACT

The pentahydrate trisodium salt of carboxy methoxy succinic acid in particulate form is recovered from aqueous solutions of trisodium carboxy methoxy succinic acid by crystallization from a supersaturated solution and filtration at a temperature from about 0° to about 50°C. Preferably the supersaturated solution is obtained by evaporation of water from a solution at a temperature of from about 0° to about 87°C at a pressure of from about 10 to about 300 millimeters of mercury.

8 Claims, 2 Drawing Figures

RECOVERY OF PENTAHYDRATE TRISODIUM SALT OF CARBOXYMETHOXY SUCCINIC ACID FROM AQUEOUS SOLUTION

Cross Reference to Related Application

This application is a continuation-in-part of Ser. No. 288,030, filed Sept. 11, 1972, now abandoned.

BACKGROUND OF THE INVENTION

1. Field of the Invention

The invention relates to the preparation of the pentahydrate trisodium salt of carboxy methoxy succinic acid:

In greater particularity, the invention relates to the recovery of the pentahydrate salt from water solutions of trisodium carboxy methoxy succinic acid.

2. Description of the Prior Art

The recovery of the pentahydrate trisodium salt of carboxy methoxy succinic acid from water solutions thereof has been a very difficult operation in the past. When one slowly boils a water solution of the trisodium salt of carboxy methoxy succinic acid at atmospheric pressures, an amorphous mass of anhydrous salt is produced. Such anhydrous trisodium carboxy methoxy succinic acid is not the desired pentahydrate salt. Although there is no significant "charring," the anhydrous material has the consistency of tar. The anhydrous material will dissolve in water, but it is not readily converted to particulate form and it is deliquescent. As a consequence, it is not readily handled in bulk. To avoid these and other problems, protic solvents such as methanol have been used as co-presence compounds for crystallization since methanol in particular depresses the water solubility of the trisodium salt of carboxy methoxy succinic acid and thereby promotes precipitation of stable hydrate salts. Although a good product quality is readily obtained in this manner and one can selectively produce the tetrahydrate salt or the pentahydrate salt or a mixture of both, it is desirable to have a satisfactory process for the recovery of a particulate form of the pentahydrate trisodium salt of carboxy methoxy succinic acid from aqueous solutions thereof without the extra complications of proportional feeding of methanol or other protic solvent and of recovering such solvent for recycle in the process.

SUMMARY OF THE INVENTION

The recovery of the pentahydrate of trisodium carboxy methoxy succinic acid in particulate form from an aqueous solution thereof is conducted in a plural step operation of crystallization from a supersaturated solution and separation of the crystals from a mother liquor. The supersaturated solution is preferably formed by evaporating water from a less concentrated solution using certain specified conditions.

Control of the temperatures used in the evaporation, crystallization and separation operations is an important aspect of the present invention. For the evaporation operation, a temperature of from about 0° to about 87°C and a pressure no higher than about 300 millimeters of mercury is required. For the crystallization operation, a temperature of from about 0° to about 50°C is required. With a crystallization operation that is subsequent to the evaporation, the pressure of the crystallization step itself is not critical. Pressures for such a subsequent crystallization may range from about 10 millimeters of mercury up to about 100 atmospheres, but preferably the pressure is about atmospheric pressure. The separation of crystals from the mother liquor is preferably accomplished by any suitable process for separating a particulate solid from a mother liquor such as decanting, filtration, centrifuging, or the like. Preferably the crystallization as well as the processing which separates the particulate solid from the mother liquor is conducted at a temperature of from about 10° to about 50°C.

Where it is desired to perform the evaporation and crystallization concurrently in a single operation, the operation is preferably performed at a temperature of from about 10° to about 50°C and at a pressure of from about 10 to about 100 millimeters of mercury. Such a combined evaporation-crystallization process produces a mixture containing particulate pentahydrate salt and a mother liquor similar to that produced where the evaporation and crystallization are conducted in different steps. The particulate salt thus obtained is readily separated at temperatures of from about 10° to about 50°C as by filtration or centrifuging as mentioned in the foregoing.

Mother liquor recovered from the separation operation is readily recycled to either or both of the evaporation and crystallization for recovery of additional salt contained therein.

Typically, the less concentrated solution is obtained by reacting maleic anhydride and glycolic acid in the presence of calcium hydroxide to produce a calcium salt and then reacting the calcium salt with sodium carbonate to produce a solution of the sodium salt. The solution is purified by filtration removal of solid material and the solution that results is usually of a concentration which is substantially less than that of a saturated solution.

Accordingly, it is seen that the present invention relates to a process for recovering particulate pentahydrate trisodium carboxy methoxy succinic acid from a supersaturated aqueous solution of trisodium carboxy methoxy succinic acid which comprises holding said solution at a temperature of from about 0° to about 50°C for a period of time sufficient to permit growth of the particles of pentahydrate trisodium carboxy methoxy succinic acid to a selected particle size, and then separating the particulate pentahydrate trisodium carboxy methoxy succinic acid from the mother liquor. Preferably the separation of the particulate pentahydrate trisodium carboxy methoxy succinic acid from the mother liquor is by filtration or centrifuging.

The time required for the growth of particles of pentahydrate trisodium carboxy methoxy succinic acid to a selected particle size ranges from about 5 minutes up to about 5 days or longer depending upon numerous factors and is readily determined by simple experimentation. Factors influencing the time depend largely upon such factors as the degree of supersaturation of the solution, the presence or absence of seed crystals, temperature, particle size desired, the presence of impurities, and the like.

In another aspect, the present invention relates to a process for producing particulate pentahydrate trisodium salt of carboxy methoxy succinic acid from a solution of the trisodium salt of carboxy methoxy succinic acid in water. In the process, water is evaporated from said solution at a temperature of from about 0° to about 87°C and a pressure of from about 10 to about 300 millimeters of mercury to form a more concentrated solution containing at least an amount of salt equivalent to a saturation amount at from about 0° to about 50°C. Pentahydrate trisodium salt of carboxy methoxy succinic acid is then crystallized from said concentrated solution at a temperature of from about 0° to about 50°C to form a mixture of said salt and mother liquor. The pentahydrate trisodium salt of carboxy methoxy succinic acid is then separated from the mother liquor.

Preferably the crystallizing step is performed at a temperature of from about 10° to about 50°C, especially at about 20° to about 40°C. Preferably the pressure at the crystallization step is about atmospheric pressure.

In one embodiment of the invention, the evaporating and crystallizing are caused to occur concurrently at a temperature of from about 0° to about 50°C and a pressure of from about 10 to about 100 millimeters of mercury. Preferably the temperature in this embodiment is from about 20° to about 40°C and the pressure is at about the vapor pressure of the solution of trisodium carboxy methoxy succinate at the temperature of operation.

It has been discovered that the vapor pressure and the viscosity of aqueous solutions of the trisodium salt of carboxy methoxy succinic acid are important considerations in the crystallization recovery of a particulate form of the pentahydrate trisodium salt of carboxy methoxy succinic acid from such solutions. It has been discovered that at temperatures above about 87°C the vapor pressure of the pentahydrate trisodium salt of carboxy methoxy succinic acid is higher than the vapor pressure of a saturated solution of trisodium carboxy methoxy succinic acid. This means that when a water solution of salt is heated above 87° to evaporate water therefrom seeking to crystallize out the pentahydrate, the pentahydrate is not obtained because the pentahydrate liberates its water of crystallization more readily than the solution liberates free water. Thus if any pentahydrate salt were to be formed it would decompose to the anhydrous salt and the decomposition would occur progressively during the heating operation resulting in the ultimate production of an anhydrous amorphous mass of tarry consistency resembling molten glass. The mass is not the desired pentahydrate and recovery of particulate pentahydrate from such a mass is not possible. Thus, an important consideration of the process of the present invention is that temperatures of 87°C must not be exceeded in the evaporation concentration of solutions of the trisodium salt of carboxy methoxy succinic acid where one desires to form the pentahydrate salt. In general, this requirement imposes the limitation that evaporation must be conducted under vacuum and furthermore that the pressure not exceed about 300 millimeters of mercury.

In addition to the foregoing, it has been discovered that another important factor involved in the crystallization recovery of the pentahydrate form of the trisodium salt of carboxy methoxy succinic acid from an aqueous solution thereof is solution viscosity. It has been discovered that the solubility in water of the trisodium salt of carboxy methoxy succinic acid increases rapidly as temperature is increased in the region from about 0° to about 100°C and even beyond. So great is the solubility at temperatures of 50°C and higher that saturated solutions of the trisodium salt of carboxy methoxy succinic acid, even without the co-presence of a precipitate of the pentahydrate trisodium salt of carboxy methoxy succinic acid, have extremely high viscosities. The high viscosities interfere with the removal of water from the system and also with the growth of the pentahydrate crystals. Saturated solutions of the trisodium salt of carboxy methoxy succinic acid at 50°C have a viscosity of about 25 centipoises which is at or near the practical upper limit of viscosity for operation of a crystallizer system.

Accordingly, it is a teaching of the present invention that a crystallization operation to produce a particulate pentahydrate trisodium salt of carboxy methoxy succinic acid from aqueous solutions is preferably conducted at temperatures of about 50°C or below.

Particularly preferred temperatures for crystallization and for recovery are from about 20 to about 40°C.

Prior to the discovery of the present temperature and pressure requirements, numerous attempts were made to prepare particulate pentahydrate trisodium carboxy methoxy succinic acid. Evaporation at reduced pressures yielded viscous masses in which particulate material would not form. In one instance, a viscous mass was seeded with particulate pentahydrate trisodium carboxy methoxy succinate with the result that crystallization occurred rapidly producing a solid mass that could be removed from the container only with difficulty and which required the exertion of mechanical force to produce smaller sized pieces.

The following examples indicate preferred embodiments of the present invention.

EXAMPLE I

Preparation of Solution Trisodium Carboxy Methoxy Succinic Acid

To a reactor was added 500 grams of water, 98.3 grams of maleic anhydride, 117.8 grams of glycolic acid, and 121.5 grams of $Ca(OH)_2$. The mixture was refluxed at atmospheric pressure and at a temperature of about 101.0°C for approximately 1½ hours. The resulting reaction product was cooled to about 64°C and 169.4 grams of $Na_2CO_3$ was added. Solids precipitated and were removed by filtration.

Recovery of Particulate Pentahydrate Trisodium Carboxy Methoxy Succinic Acid from an Aqueous Solution of Trisodium Carboxy Methoxy Succinic Acid A solution of trisodium carboxy methoxy succinic acid was prepared as above. The solute was approximately 86.1 percent by weight of trisodium carboxy methoxy succinic acid, the rest of the solute being mainly maleate and glycolate salts.

The solution was concentrated by boiling under vacuum at a temperature of 35°C. Evaporation was continued until the solution was about saturated.

The saturated solution was then cooled to 25°C and crystallization occurred. The crystals were separated from the mother liquor by filtration at about 25°C. Product $Na_3CMOS \cdot 5H_2O$ was obtained having a purity of 96.2 percent, much of the maleate and glycolate salts remaining in the mother liquor. The mother liquor was recovered, again evaporated to saturation at 35° and cooled to 25°C for crystallization. The evaporation-cooling process was repeated for a total of five cycles recovering additional quantities of Na₃CMOS.5-H₂O of high purity each time.

EXAMPLE II

Vapor pressure measurements were made of saturated solutions of the trisodium salt of carboxy methoxy succinic acid in water at temperatures ranging from about 30° to about 125°C. The apparatus used consisted of a vacuum filter flask provided with a thermometer, a magnetic stirrer and a heater. The side tube of the flask was connected to a vacuum source and to a Zimmerli gauge and controlled to maintain measured subatmospheric pressures in the flask.

A saturated solution of the trisodium salt of carboxy methoxy succinic acid in water was prepared at room temperature. The solution was heated to 35.5°C and sufficient trisodium salt of carboxy methoxy succinic acid pentahydrate added to produce a saturated solution as observed by the presence of some undissolved crystals. Pressure on the system was reduced until boiling began. The pressure was 37 mm Hg absolute.

EXAMPLE III

The pressure was increased in the system of Example II to prevent boiling and the temperature was raised to 41.0°C. Upon a subsequent reduction of pressure, boiling began at 48 mm Hg absolute.

EXAMPLE IV

Example III was repeated, raising the temperature to 64°C. Upon a subsequent reduction of the pressure, boiling began at 132 mm Hg absolute.

Other examples were run to provide data for Curve A of FIG. 1 which is a plot of vapor pressure versus temperature for saturated solutions of the trisodium salt of carboxy methoxy succinic acid.

EXAMPLE V

A solution of the trisodium salt of carboxy methoxy succinic acid in water was heated to the boiling point at atmospheric pressure. Crystalline pentahydrate trisodium salt of carboxy methoxy succinic acid was added to the solution; however, apparently the added material gave up its water of hydration promptly because undissolved crystals never were obtained. An amorphous, glass solid mass was removed from the solution and determined to be anhydrous trisodium salt of carboxy methoxy succinic acid.

EXAMPLE VI

The pressure existing above a sample of particulate pentahydrate trisodium salt of carboxy methoxy succinic acid at various temperatures was measured over the temperature range of 30° to 100°C to obtain data for Curve B of FIG. 1.

The principal significance of these curves is that at temperatures higher than about 87°C the particulate pentahydrate has a higher vapor pressure than the solution. This means that at temperatures higher than about 87°C, the pentahydrate is more prone to the release of water than the solution. Thus where particulate pentahydrate trisodium salt of carboxy succinic acid is desired rather than the anhydrous trisodium salt of carboxy methoxy succinic acid, evaporation temperatures below about 87°C and pressures of about 300 mm of mercury and lower are necessary to favor the release of free water from the solution rather than release of the water of hydration from the precipitated hydrate.

EXAMPLE VII

Figure 2:
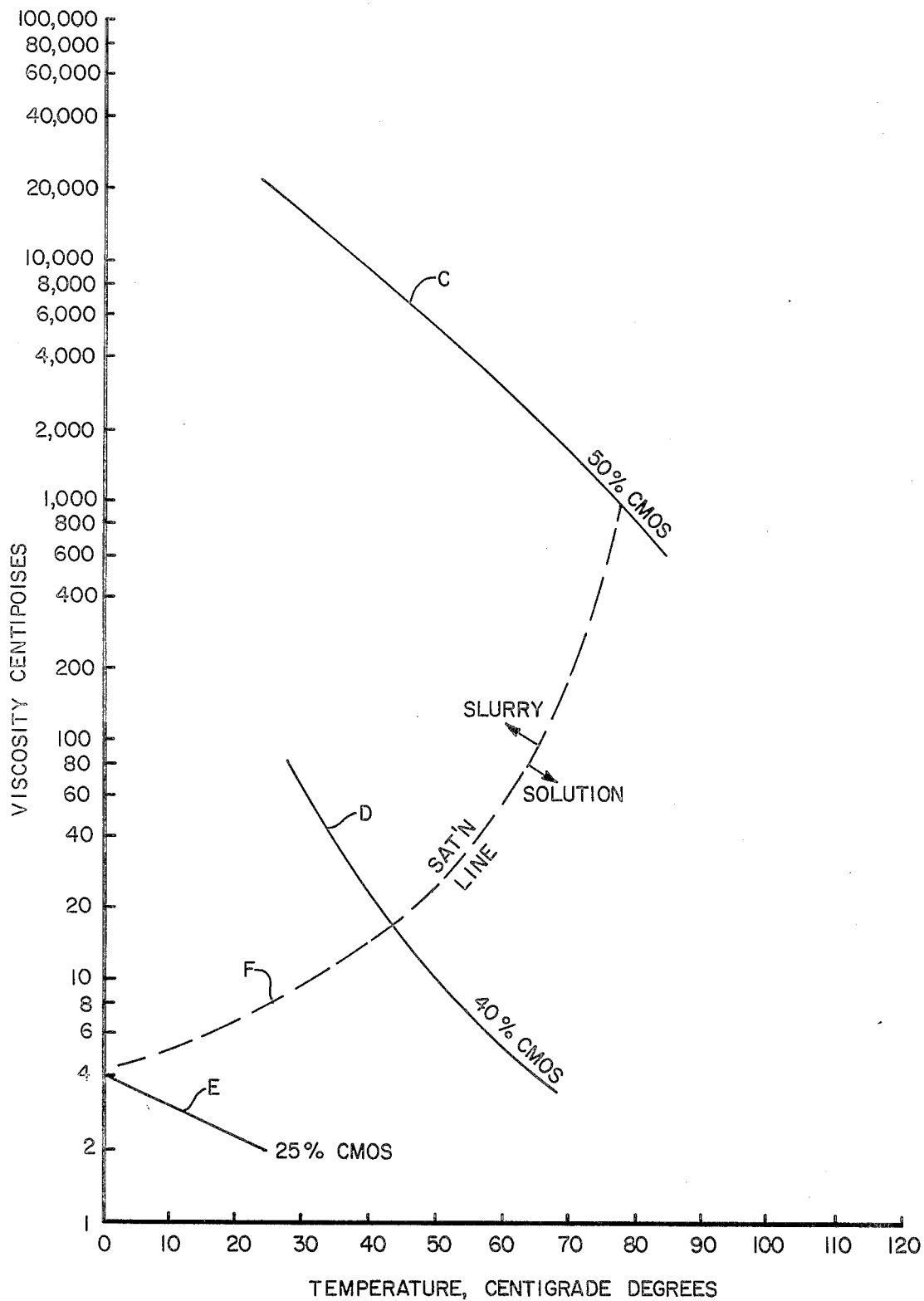

Viscosity measurements were made of various mixtures of the pentahydrate trisodium salt of carboxy methoxy succinic acid and water. Three different mixtures were prepared, containing respectively 25, 40 and 50 wt. percent (anhydrous basis) of the trisodium salt of carboxy methoxy succinic acid. Each mixture was prepared at about 30°C and the viscosity measured at that and at various other temperatures. The temperatures chosen for viscosity measurement were selected to provide a profile ranging from systems containing undissolved particulate pentahydrate trisodium salt of carboxy methoxy succinic acid to solutions containing less than a saturation amount of the trisodium salt of carboxy methoxy succinic acid. The results of the foregoing experiments are plotted in FIG. 2 with curves C, D and E showing respectively plots of viscosity in centipoises versus temperature in degrees centigrade for the 50 percent, the 40 percent and the 25 percent trisodium salt of carboxy methoxy succinic acid (anhydrous basis) systems. For purposes of reference, a saturation line F is indicated. Regions above and to the left of line F represent slurry systems and regions below and to the right of line F represent solutions. In general, as one proceeds below and to the right from the saturation line F alone any of the concentration lines C, D or E, or similar lines at other concentrations, one attains solutions of lesser degree of saturation. It will be observed that the saturated solutions; i.e., those along line F, experience rapid viscosity increases with temperature. It is noted, for example, that the viscosity of a saturated solution of the trisodium salt of carboxy methoxy succinic acid at 78°C is about 1000 centipoises which is much too viscous to be practical for crystallizer operations. Even at 66°, the viscosity of the saturated solution is 100 centipoises which is too viscous for practical crystallizer operation.

It is to be noted that about 25 centipoises is the maximum viscosity for efficient crystallizer operation. This requires temperatures of about 50°C and lower. Viscosities thus range from about 2 to about 25, preferably from about 2 to about 12 centipoises, corresponding to temperatures of from below 0° to about 40°C. In general, consistent operation below about 20°C requires costly refrigeration, thus temperatures of from about 20° to about 40°C are preferred.

In measuring the viscosity to derive the foregoing data, the following procedure was used. A solution of the trisodium salt of carboxy methoxy succinic acid and water was formed by adding to water at 30°C a selected amount (anhydrous basis) of pentahydrate trisodium salt of carboxy methoxy succinic acid. Viscosity of a system containing 40 percent salt (anhydrous) was measured at 30° using a Brookfield Model LVT Viscosimeter. In this instance, a No. 2 spindle was inserted into the machine and the spindle was rotated at 60 rpm. The stable scale reading was 15.7 over 100.0 to provide a viscosity calculated to be 65 centipoises.

Following the foregoing test at 30°C, the system was raised to 40°C and another viscosity reading taken. This procedure was repeated for measurements at 50° and at 60°C. The spindle was changed to a No. 1 spindle for measurements at 60°C. The foregoing procedure was repeated at appropriate temperatures for each of the other concentrations shown. The data thus obtained were used to prepare the 25 percent, 40 percent and 50 percent curves of FIG. 2.

We claim:

1. A process for recovering particulate pentahydrate trisodium carboxy methoxy succinic acid from a supersaturated aqueous solution of trisodium carboxy methoxy succinic acid which comprises:

holding said solution at a temperature of from about 0° to about 50°C for a period of time sufficient to permit growth of the particles of pentahydrate trisodium carboxy methoxy succinic acid to a selected particle size, and then separating the particulate pentahydrate trisodium carboxy methoxy succinic acid from the mother liquor.

2. The process of claim 1 wherein the separation of the particulate pentahydrate trisodium carboxy methoxy succinic acid from the mother liquor is by filtration or centrifuging.

3. A process for producing particulate pentahydrate trisodium salt of carboxy methoxy succinic acid from a solution of the trisodium salt of carboxy methoxy succinic acid in water which comprises evaporating water from said solution at a temperature of from about 0° to about 87°C and a pressure of from about 10 to about 300 millimeters of mercury, to form a more concentrated solution containing at least a saturation amount of said salt at from about 0° to about 50°C, crystallizing pentahydrate trisodium salt of carboxy methoxy succinic acid from said concentrated solution at a temperature of from about 0° to about 50°C to form a mixture of said salt and mother liquor and separating the pentahydrate trisodium salt of carboxy methoxy succinic acid from the mother liquor.

4. The process of claim 3 wherein the crystallizing step is performed at a temperature of from about 10° to about 50°C.

5. The process of claim 3 wherein the crystallizing step is performed at a temperature of from about 10° to about 50°C and at about atmospheric pressure.

6. The process of claim 3 wherein the temperature of the evaporating and crystallizing is from about 10° to about 50°C and the pressure is from about 10 to about 100 millimeters of mercury.

7. The process of claim 6 wherein the temperature is from about 20° to about 40° and the pressure is at about the vapor pressure of the solution of trisodium carboxy methoxy succinate at the temperature of operation.

8. The process of claim 3 wherein the viscosity of the concentrated solution at the crystallization step is from about 2 to about 12 centipoises.

* * * * *

UNITED STATES PATENT OFFICE
CERTIFICATE OF CORRECTION

Patent No. 3,894,081      Dated July 8, 1975

Inventor(s) William J. Dunlap et al

It is certified that error appears in the above-identified patent and that said Letters Patent are hereby corrected as shown below:

The formula for Column 1 should read:

Columns 3 and 4 as shown on the attached sheet should be added but will apply to the Grant only.

*Signed and Sealed this fourth Day of May 1976*

[SEAL]

Attest:

RUTH C. MASON
*Attesting Officer*

C. MARSHALL DANN
*Commissioner of Patents and Trademarks* acid in water. In the process, water is evaporated from said solution at a temperature of from about 0° to about 87°C and a pressure of from about 10 to about 300 millimeters of mercury to form a more concentrated solution containing at least an amount of salt equivalent to a saturation amount at from about 0° to about 50°C. Pentahydrate trisodium salt of carboxy methoxy succinic acid is then crystallized from said concentrated solution at a temperature of from about 0° to about 50°C to form a mixture of said salt and mother liquor. The pentahydrate trisodium salt of carboxy methoxy succinic acid is then separated from the mother liquor.

Preferably the crystallizing step is performed at a temperature of from about 10° to about 50°C, especially at about 20° to about 40°C. Preferably the pressure at the crystallization step is about atmospheric pressure.

In one embodiment of the invention, the evaporating and crystallizing are caused to occur concurrently at a temperature of from about 0° to about 50°C and a pressure of from about 10 to about 100 millimeters of mercury. Preferably the temperature in this embodiment is from about 20° to about 40°C and the pressure is at about the vapor pressure of the solution of trisodium carboxy methoxy succinate at the temperature of operation.

It has been discovered that the vapor pressure and the viscosity of aqueous solutions of the trisodium salt of carboxy methoxy succinic acid are important considerations in the crystallization recovery of a particulate form of the pentahydrate trisodium salt of carboxy methoxy succinic acid from such solutions. It has been discovered that at temperatures above about 87°C the vapor pressure of the pentahydrate trisodium salt of carboxy methoxy succinic acid is higher than the vapor pressure of a saturated solution of trisodium carboxy methoxy succinic acid. This means that when a water solution of salt is heated above 87° to evaporate water therefrom seeking to crystallize out the pentahydrate, the pentahydrate is not obtained because the pentahydrate liberates its water of crystallization more readily than the solution liberates free water. Thus if any pentahydrate salt were to be formed it would decompose to the anhydrous salt and the decomposition would occur progressively during the heating operation resulting in the ultimate production of an anhydrous amorphous mass of tarry consistency resembling molten glass. The mass is not the desired pentahydrate and recovery of particulate pentahydrate from such a mass is not possible. Thus, an important consideration of the process of the present invention is that temperatures of 87°C must not be exceeded in the evaporation concentration of solutions of the trisodium salt of carboxy methoxy succinic acid where one desires to form the pentahydrate salt. In general, this requirement imposes the limitation that evaporation must be conducted under vacuum and furthermore that the pressure not exceed about 300 millimeters of mercury.

In addition to the foregoing, it has been discovered that another important factor involved in the crystallization recovery of the pentahydrate form of the trisodium salt of carboxy methoxy succinic acid from an aqueous solution thereof is solution viscosity. It has been discovered that the solubility in water of the trisodium salt of carboxy methoxy succinic acid increases rapidly as temperature is increased in the region from about 0° to about 100°C and even beyond. So great is the solubility at temperatures of 50°C and higher that saturated solutions of the trisodium salt of carboxy methoxy succinic acid, even without the co-presence of a precipitate of the pentahydrate trisodium salt of carboxy methoxy succinic acid, have extremely high viscosities. The high viscosities interfere with the removal of water from the system and also with the growth of the pentahydrate crystals. Saturated solutions of the trisodium salt of carboxy methoxy succinic acid at 50°C have a viscosity of about 25 centipoises which is at or near the practical upper limit of viscosity for operation of a crystallizer system.

Accordingly, it is a teaching of the present invention that a crystallization operation to produce a particulate pentahydrate trisodium salt of carboxy methoxy succinic acid from aqueous solutions is preferably conducted at temperatures of about 50°C or below.

Particularly preferred temperatures for crystallization and for recovery are from about 20 to about 40°C.

Prior to the discovery of the present temperature and pressure requirements, numerous attempts were made to prepare particulate pentahydrate trisodium carboxy methoxy succinic acid. Evaporation at reduced pressures yielded viscous masses in which particulate material would not form. In one instance, a viscous mass was seeded with particulate pentahydrate trisodium carboxy methoxy succinate with the result that crystallization occurred rapidly producing a solid mass that could be removed from the container only with difficulty and which required the exertion of mechanical force to produce smaller sized pieces.

The following examples indicate preferred embodiments of the present invention.

EXAMPLE I

Preparation of Solution Trisodium Carboxy Methoxy Succinic Acid

To a reactor was added 500 grams of water, 98.3 grams of maleic anhydride, 117.8 grams of glycolic acid, and 121.5 grams of $Ca(OH)_2$. The mixture was refluxed at atmospheric pressure and at a temperature of about 101.0°C for approximately 1½ hours. The resulting reaction product was cooled to about 64°C and 169.4 grams of $Na_2CO_3$ was added. Solids precipitated and were removed by filtration.

Recovery of Particulate Pentahydrate Trisodium Carboxy Methoxy Succinic Acid from an Aqueous Solution of Trisodium Carboxy Methoxy Succinic Acid A solution of trisodium carboxy methoxy succinic acid was prepared as above. The solute was approximately 86.1 percent by weight of trisodium carboxy methoxy succinic acid, the rest of the solute being mainly maleate and glycolate salts.

The solution was concentrated by boiling under vacuum at a temperature of 35°C. Evaporation was continued until the solution was about saturated.

The saturated solution was then cooled to 25°C and crystallization occurred. The crystals were separated from the mother liquor by filtration at about 25°C. Product $Na_3CMOS.5H_2O$ was obtained having a purity of 96.2 percent, much of the maleate and glycolate salts remaining in the mother liquor. The mother liquor was recovered, again evaporated to saturation at 35° and cooled to 25°C for crystallization. The evaporation-cooling process was repeated for a total of five cy-